Feb. 9, 1960
C. H. SPITLER
2,924,730
ELECTRIC VIBRATOR
Filed Sept. 16, 1957
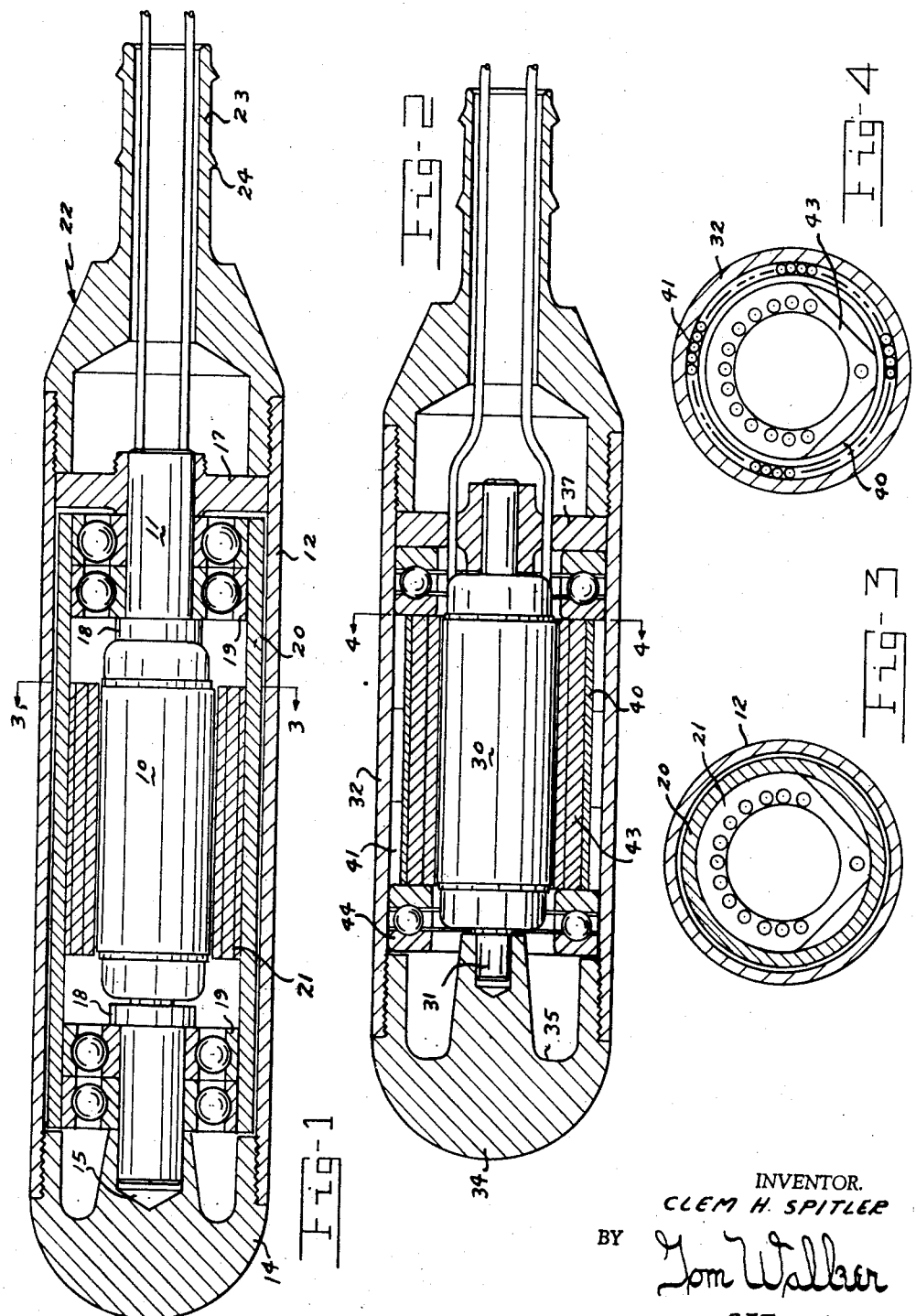
INVENTOR.
CLEM H. SPITLER
BY Tom Walker
ATTORNEY United States Patent Office 2,924,730
Patented Feb. 9, 1960

2,924,730

ELECTRIC VIBRATOR

Clem H. Spitler, Dayton, Ohio, assignor to Master Vibrator Company, Dayton, Ohio, a corporation of Ohio Application September 16, 1957, Serial No. 684,210

10 Claims. (Cl. 310—81)

This invention relates to vibrators and more particularly to an eccentric rotor type electric vibrator.

The present invention developed with the objective of reducing vibrator structure to the barest elements so that maximum vibration could be obtained for a minimum dimension. This objective has been reached by the provision of an eccentric rotor type electric vibrator having an inside-out type of motor. Embodiments of the invention require no brushes and, accordingly, the operating life of the basic vibrator unit is considerably increased thereby. The vibrator in accordance with the invention is simple and operates at maximum efficiency.

The object of the invention is to improve and simplify the construction as well as the means and mode of operation of electric vibrators whereby such vibrators may not only be economically manufactured, but will be more efficient and satisfactory in use, adaptable to a wide variety of applications, and be unlikely to get out of repair.

A further object of the invention is to provide a simplified vibrator unit providing maximum vibration and amplitude for minimum dimension.

Another object of the invention is to provide a vibrator unit having a minimum number of components and a minimum of maintenance requirements.

An additional object of the invention is to provide an improved electric vibrator which includes an inside-out type of motor.

Another object of the invention is to provide an improved eccentric rotor type vibrator wherein the rotor is disposed outside of the stator.

A further object of the invention is to provide an electric vibrator possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Like parts are indicated by similar characters of reference throughout the several views.

Fig. 1 is a cross-sectional view of a vibrator unit in accordance with the invention;

Fig. 2 is a cross-sectional view similar to that of Fig. 1 of a further modification of the invention;

Fig. 3 is a cross-sectional view taken on line 3—3 of Fig. 1; and

Fig. 4 is a cross-sectional view taken on line 4—4 of Fig. 2.

The invention can be best described with reference to the drawings. As shown in Figs. 1 and 3, a stator 10 is provided which is mounted centrally of a shaft 11, the respective extremities of which project coaxially from the ends of the stator. A cylindrical tube 12 houses the stator in concentric spaced relation thereto.

The respective ends of the tubular housing 12 are internally threaded. A generally hemispherical cap 14 provided with an externally threaded tubular projection to one end engages in one end of housing 12 in capping relation thereto. The inner face of the cap is centrally recessed at 15 to seat the extremity of the shaft 11 to one end of the stator while a centrally apertured plate 17 fixed inwardly of the other end of the housing 12 is centrally apertured to receive and seat the other end of the shaft. The stator 10 is thus supported within and in spaced relation to the housing 12 in a relatively central position.

The shaft 11 is provided with fixed collars 18 spaced inwardly from its respective extremities and outwardly of the respective ends of the stator. A pair of roller bearings 19 are contained about the shaft 11 between the collar 18 and the plate 17 to one end and between cap 14 and the collar 18 to the other end. Spaced immediately within the housing 12 is a tube 20 which is concentric with the stator 10 and supported at its respective ends on the bearings 19 for rotation relative the stator.

An unbalanced rotor body 21, the irregular cross-sectional configuration of which is apparent from Fig. 3 of the drawings, is press fit in the tube 20 to mount concentrically with and about the stator 10 and intermediate the respective pairs of bearings 19. The rotor 21, noting Fig. 3 of the drawings, has a squirrel cage embedded therein.

An adapter 22 is threadedly engaged in the said other end of housing 12 to abut the outer face of the plate 17 and provide a tubular adapter portion 23 having circular radial projections 24 for attachment of an appropriate flexible casing thereto to house electric cable connecting to the stator in the housing.

The electric vibrator thus effected has an inside-out type of motor. On supply of energy, the rotor 21 being pressed into the tube 20 will rotate therewith on the ball bearings 19 and around the wound field which is stationary and in the center of the tube 12. It is noted that this particular vibrator is preferably made of a four pole design so that the north and south poles are 90° apart. Thus, it will only be necessary to have the flux travel 90° in order to complete the magnetic circuit. To obtain speed from 10–12,000 r.p.m., a frequency converter from 60 cycle, single phase to 400 cycle, three phase is employed. This converter is portable and of the wound or permanent magnetic type alternator.

The provision of an unbalanced rotor body about a fixed stator as provided in the described embodiment of the invention produces maximum vibration and amplitude for minimum dimension. The number of components in the improved vibrator are minimum. They are so simply related that their fabrication into a finished product is economical and maximum efficiency obtains. It is noted that while a cut-off type rotor is illustrated in the drawings, the invention is not intended to be limited thereby.

A further embodiment of the invention is illustrated in Figs. 2 and 4 of the drawings. Here, a stator 30 is provided which is mounted to a shaft 31 intermediately of its respective extremities as in the first described embodiment. A cylindrical tube 32 houses the stator 30 in concentric spaced relation thereto. The respective ends of the tubular housing 32 are internally threaded and one end of the housing is closed by a generally hemispherical cap 34 provided with an externally threaded tubular projection which threadedly engages thereto. The inner face 35 of the cap 34 is provided with an inwardly extending centrally recessed projection which seats one end of the shaft 31 immediately adjacent one end of the stator 30. A centrally apertured plate 37 having its aperture defined by an axially extending tubular hub portion is fixed in tube 32 adjacent the other end of the stator to seat the other end of the shaft 31 within its central aperture. A tube 40, disposed in concentric spaced relation about the stator 30, is concentrically spaced from the inner wall of the housing 32 by needle bearings 41 thereabout. An unbalanced rotor body 43 is press fit within the tube 40 to be disposed immediately about the stator 30. The rotor body 43 and its connected tube 40 run coextensively.

Thrust bearings 44 are disposed within the housing 32 to peripherally engage the inner wall thereof and have their faces respectively abut the inner face of the cap 34 and one end of the tube and connected rotor and the inner face of the apertured plate to the other end of the housing and the other end of the tube and connected rotor. The thrust bearings 44 thereby contain the unbalanced rotor and connected tube endwise while the roller bearings 41 contain them peripherally. This containment effects a precisely operating vibrator which will be cyclically identical. The unbalance will be predetermined and will not vary from the intended operation. Apertures are provided in plate 37 for leads from the stator 30.

There are no further structural differences between the first described embodiment and this form of the invention and the remarks applicable to the first described form are equally applicable here.

The simplicity of the invention vibrator lends itself to effecting precise unbalance and provides a device which is not unlikely to get out of repair. The low cost and maximum efficiency concepts as enabled by the employment of the invention as described herein are of substantial importance in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An electric vibrator including a housing, an unbalanced rotor within said housing, roller bearings interposed between the inner wall of said housing and the outer surface of said rotor to bearingly support said rotor in said housing for rotation relative thereto, means in said housing containing said rotor and said bearings against axial displacement and a stator fixed in said housing concentrically within said rotor.

2. The structure as set forth in claim 1 wherein a adapter is connected to said housing and said adapter affords a channel accommodating leads from said stator.

3. An electric vibrator including, a housing, electrically energizable stator means fixedly supported within said housing coaxially therewith an unbalanced rotor concentrically mounted within said housing intermediate said stator and said housing, bearing means engageable with said rotor adjacent its periphery to support said rotor for rotary motion about said stator within said housing, the construction and arrangement being such that upon energization of the stator means the unbalanced rotor is caused to rotate upon its bearing support to thereby impart a vibratory motion to said housing, thrust bearings mounted in said housing to contain said rotor against axial displacement relative said stator and housing and an adapter connected to said housing for directing a source of energy to said energizable means.

4. An electric vibrator including, a tubular housing, means capping one end of said housing, a support fixed in the other end of said housing, a wound stator having shaft means projecting from its extremities and respectively fixed in said cap means and in said support and an eccentric rotor in said housing having bearing means externally thereof and bearing against the inner wall of said housing.

5. An electric vibrator including, a tubular housing, a stator within said housing having projecting shaft means at its respective extremities, means fixed to the respective ends of said housing fixedly mounting said shaft means, bearings about said shaft means, a tube bearingly supported on said bearings within said housing for rotation relative thereto, an unbalanced rotor body secured within said relatively rotatable tube for rotation therewith and means for energization of said rotor through the medium of said stator whereby a vibrator unit providing maximum vibration and amplitude for minimum dimension obtains.

6. A vibrator including a housing, a relatively fixed element therein and a relatively rotatable element therein disposed about said relatively fixed element, said relatively fixed element including means inducing relative rotation of said relatively rotatable element, said relatively rotatable element including an unbalanced irregularly formed body inducing maximum vibration and amplitude for minimum dimension of said elements and bearings intermediate a portion of the housing and the peripheral area of the rotatable element supporting the element for rotation relative to the housing.

7. A vibrator unit including a housing having relatively fixed inner and outer elements, rotatable means mounted to said housing intermediate said element said rotatable means having an irregularly formed body therein disposed about the said inner fixed element, said inner fixed element having means for energizing said rotatable means for rotation relative thereto to induce maximum vibration for minimum dimension.

8. An electric vibrator including, a generally tubular housing, means capping one end of said housing, support means at the other end of said housing, a stator having shaft means respectively fixed in said cap and said support means, bearings to either end of said housing about said shaft means and contained against longitudinal displacement relative said shaft means, a tube concentric with said housing and spaced relative thereto, said tube being connected to said bearings for rotation relative said shaft means and eccentric rotor secured within said tube means and disposed about said stator.

9. The structure as set forth in claim 8, wherein an adapter is connected to said housing and said adapter affords a channel accommodating leads from said stator.

10. An electric concrete vibrator, including an elongated cylindrical housing, a cap and a bearing plate received in opposite ends of said housing, a stator concentrically disposed in said housing with its ends mounted in said cap and plate, rotor means in surrounding relation to said stator including an unbalanced rotor element, rolling means supporting said rotor means for rotation relatively to said stator, and electrical leads to said stator entering the housing through one end thereof, said stator and said one end of the housing being in communication through said plate, the opposite end of said housing being closed by said cap, said cap being contoured to facilitate introduction of the vibrator into masses of unset concrete.

References Cited in the file of this patent

UNITED STATES PATENTS

| | | |
|---|---|---|
| 1,459,848 | Mitchel | June 26, 1923 |
| 2,059,239 | Jackson | Nov. 3, 1936 |
| 2,079,909 | Jackson | May 11, 1937 |
| 2,225,338 | Geiss | Dec. 17, 1940 |
| 2,428,285 | Lea | Sept. 30, 1947 |

FOREIGN PATENTS

| | | |
|---|---|---|
| 400,390 | Germany | Aug. 6, 1924 |